July 10, 1934.        F. E. DAYES        1,965,735
SPARE WHEEL CARRIER FOR TRACTORS
Filed March 16, 1932        2 Sheets-Sheet 1
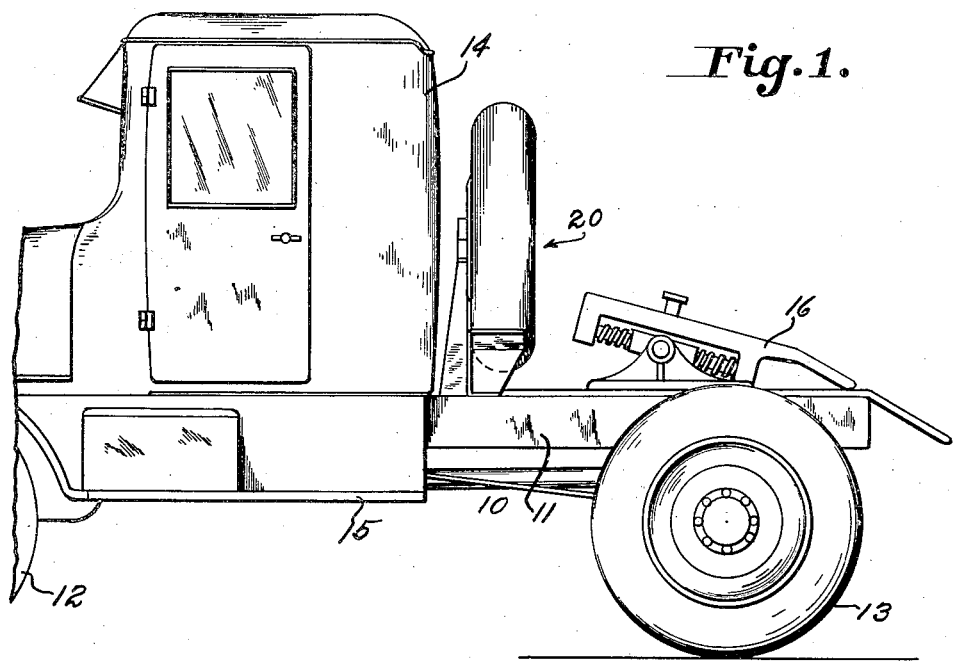
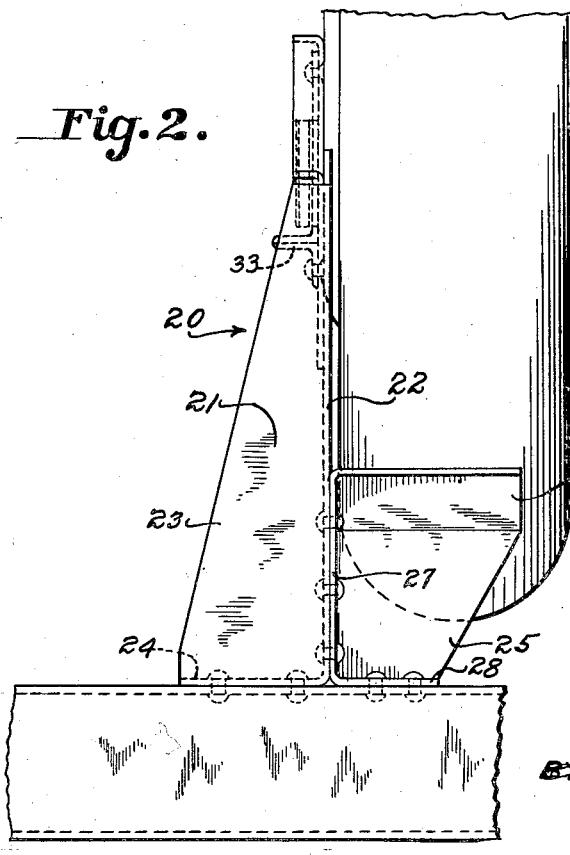
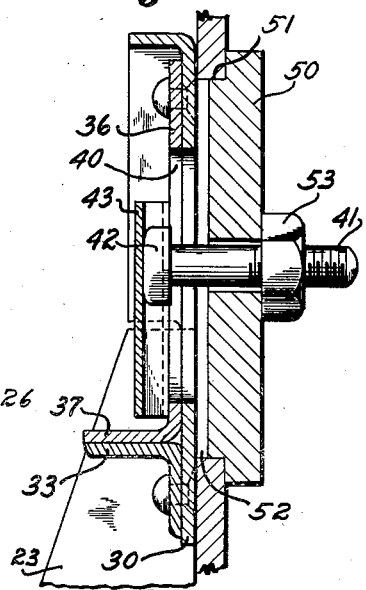
INVENTOR
Frederick E. Dayes.
ATTORNEY

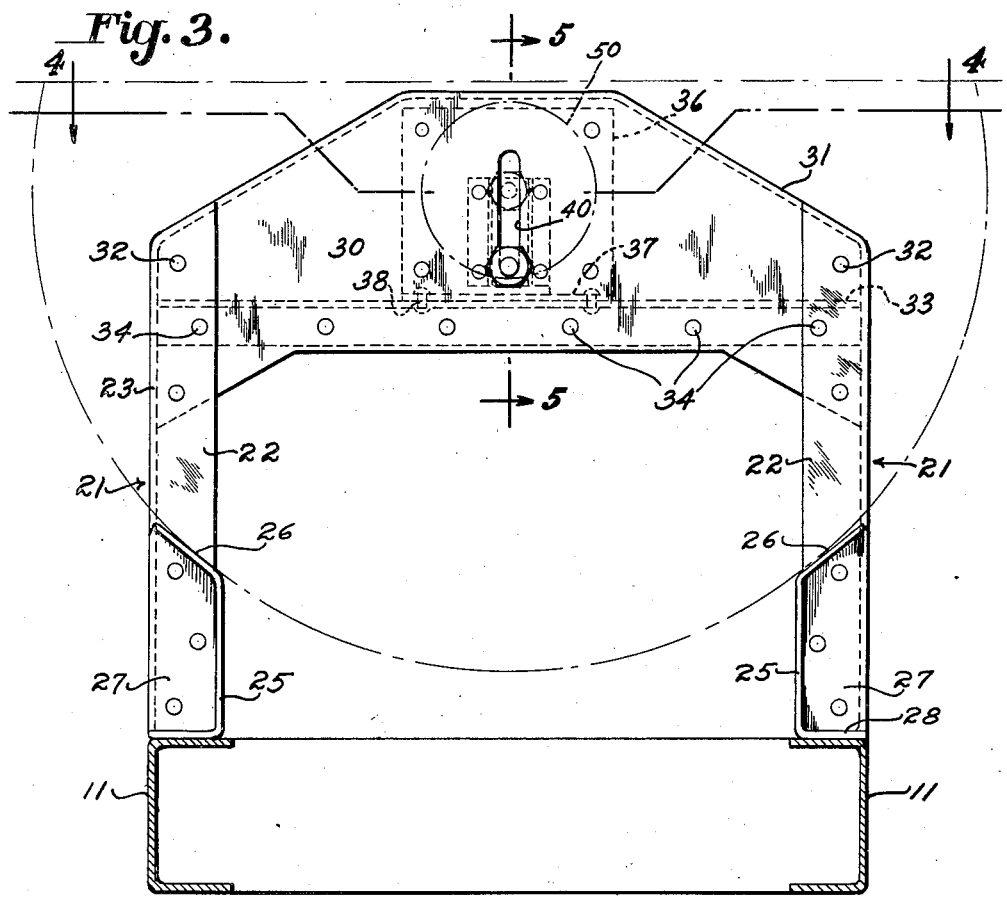

Patented July 10, 1934

1,965,735

UNITED STATES PATENT OFFICE 1,965,735

SPARE WHEEL CARRIER FOR TRACTORS

Frederick E. Dayes, Detroit, Mich., assignor to American Car and Foundry Motors Company, New York, N. Y., a corporation of Delaware Application March 16, 1932, Serial No. 599,203

6 Claims. (Cl. 224—29)

This invention relates to spare-wheel carriers for vehicles and with regard to certain more specific features thereof to improvements in the construction of tractors for the carrying of spare wheels or tires thereon.

The development of the tractor art to the manufacture of the larger and more powerful tractor, requiring exceptionally large and heavy wheels, has presented a difficult problem in the type and place of mounting of the spare-wheel equipment. The short length of running boards, the arrangement of the cab doors, and the conventional mounting of other equipment on the running boards has eliminated these sections of the tractor from consideration in placing the spare-wheel equipment. The condition peculiar to tractors involving the attachment of a trailer at the rear of the vehicle eliminates this section from consideration. Mounting of the heavy spare-wheel, including the tire, on the back of the cab would require special reinforcement of the cab body and destroy the riding qualities of the vehicle. It is obvious that the mounting of the spare wheel centrally at the back of the cab, and with other points of suspension on the side rails, would cause extreme racking of the cab, as the latter does not sway in unison with the chassis.

The present invention has therefore for one of its objects to provide an improved tractor construction involving a mounting for a spare-wheel which will not interfere with the riding qualities of the vehicle nor tend to destroy any part thereof, and which will not interfere with the opening of the cab doors on either side, nor in any way interfere with the attachment of the trailer.

Another object of the invention is to provide an inexpensive, durable and rigid bracket construction adapted to be quickly and conveniently attached to the side rails of the tractor, and having cradling and securing means whereby a heavy wheel may be supported and rigidly held in such manner that the normal action of the cab is not affected and no substantially contrary vibrational periods are set up.

Still another object is to provide a bracket construction which extends transversely of the vehicle and connects with the opposite side rails thereof so as to provide an additional reinforcing means for the frame, and a still further object resides in the construction of the securing means for the wheel, which is of simple construction and is easily adjustable to accommodate wheels of different sizes or types, or wheels having tires with different degrees of inflation.

Other objects will be in part obvious and in part pointed out particularly hereinafter.

The invention accordingly consists in the various features of construction, combinations of elements and arrangements of parts which will be exemplified by the construction hereinafter set forth and the scope of the application of which will be indicated in the appended claims.

In the drawings, Figure 1 is a view in side elevation of a portion of a tractor embodying the improved features.

Fig. 2 is an enlarged view of a portion of the tractor shown in Fig. 1.

Fig. 3 is a view of the parts shown in Fig. 2 looking from right to left.

Fig. 4 is a sectional view taken on the line 4—4 of Fig. 3, and

Fig. 5 is a sectional view taken on the line 5—5 of Fig. 3.

Referring more particularly to the drawings, a tractor chassis is indicated at 10 including opposite side rails 11, a pair of front wheels 12 and a pair of rear wheels 13.

A cab 14 is mounted in conventional manner on the chassis 10. Running boards 15 are provided on either side of the chassis and a trailer-attaching device 16 is mounted at the rear of the chassis frame.

A spare-wheel supporting bracket 20 is secured to the side rails 11 rearwardly to the cab 14 and considerably in advance of the rear wheels 13. This locates the bracket 20 in advance also of the trailer-attaching device 16.

The bracket 20 comprises two spaced uprights 21 preferably of pressed sheet metal. Each upright 21 is provided with a vertical transversely extending flange 22, a web 23 and an inwardly extending bottom flange 24. A cradle element 25 preferably of pressed sheet metal is secured to the flange 22 at the lower end of each upright 21. These cradle members have inclined tire seating flanges 26, a vertical attaching flange 27, whereby it is riveted to the flange 22 of the upright, and a base flange 28, which forms with the flange of the upright a substantial attaching foot at either side of the bracket.

The upper ends of the spaced uprights are joined by a cross-member 30 preferably of pressed sheet metal peripherally flanged at 31 and connected to the uprights 21 by rivets 32. A reinforcing bar 33 preferably in the form of a commercially rolled angle section extends along the forward face of the cross-member 30 and is secured thereto and to the upright 21 by rivets 34. A central reinforcing plate 36 is secured to the forward face of the cross-member 30 and is provided with a flange 37 which abuts the angle bar 33 and is riveted thereto as indicated at 38.

The cross-member and its reinforcing plate are slotted vertically as indicated at 40 and a securing bolt 41 is adjustably positioned in the slot with its head 42 forwardly of the reinforcing plate 36. Channel means 43 are secured as illustrated in Figs. 4 and 5 to the forward face of the reinforcing plate 36 and embrace the bolt head 42 so as to allow sliding movement of the bolt in the slot 40 and prevent rotation of the bolt by engagement of the bolt head with opposite sides of the channel means. The latter are preferably suitably terminated below the upper end of the slot 40 as illustrated in Fig. 3 so that removal of the entire bolt is permitted in case replacement or substitution should be necessary.

Preferably the attaching feet of the bracket are riveted to the upper flanges of the conventional channel-section side rails of the tractor and when no spare wheel is in position the shank of the bolt 41 drops to the lower part of the slot 40 as indicated in Fig. 3. In that figure the operative position of the bolt 41 and the located position of the spare wheel are indicated by dot and dash lines. Obviously the bolt may be located anywhere along the slot according to the position of the center opening of the spare wheel as determined by its diameter and possible variations in that diameter due to different conditions of tire inflation or different sizes of tires.

As shown in the present drawings the spare wheel is of one conventional type having a steel body with a substantially central circular opening. To accommodate this type of wheel a disk 50 is loosely mounted on the shank of bolt 41 and is provided with a shoulder 51 which fits in the opening 52 in the wheel. A nut 53 is threaded onto the end of the bolt and is tightened against the plate 50 to secure the wheel in position as will be readily understood.

While the invention in certain of its aspects may be applicable to motor vehicles in general, it is particularly pertinent to tractor construction. The terms "wheel" or "spare wheel" as used herein are not intended to be limiting but have reference either to a complete hub, felly and tire or to a rim and tire or possibly merely a tire. The term "upright" as used herein, either with regard to the bracket or the position of the wheel, is not intended to limit the construction to an exactly vertical position but is meant to include reasonable angularity of position wherein the bracket or wheel might be considered as substantially upstanding.

What is claimed is:

1. In a spare-wheel carrier adapted for installation on a tractor, a bracket comprising two uprights spaced the distance of the side rails of the tractor, said uprights each having a vertical transversely extending flange, a web and a bottom flange, a cradle member, having a tire cradle flange, secured to the lower part of each bracket, a cross-member having opposite ends secured to the upper parts of the uprights, a central reinforcing plate secured to said cross-member, a bolt movable in a vertical slot in the cross-member and secured plate, channel means parallel with the slot and embracing the bolt head, and a nut on said bolt.

2. In a spare-wheel carrier adapted for installation on a tractor, a bracket comprising a pair of spaced uprights of flanged sheet metal connected at their upper ends by a flanged sheet metal cross-member having a central reinforcing plate secured thereto, cradle elements of flanged sheet metal secured to the lower ends of the uprights and forming with said lower ends attaching feet for the opposite side rails of a tractor, and a securing bolt arranged in a vertical slot in the cross-member.

3. A spare wheel carrier adapted to be mounted on a vehicle chassis having side frame members, comprising a transverse bracket having means thereon for adjustably securing a wheel thereto at the hub portion of the latter, spaced members connected to opposite end portions of the bracket and depending therefrom and secured to the upper surfaces of said side members, and cradle members resting on the upper surfaces of the side frame members and connected to said depending members and having their effective surfaces so arranged as to support a wheel in a plane entirely above the upper portions of the side frame members.

4. In combination with a vehicle frame, a spare wheel carrier comprising a pair of spaced uprights directly connected to said frame, an inclined seating flange on the lower portion of each of said uprights arranged above the upper surfaces of said frame, and a transverse bracket connecting the upper portions of the uprights and having means thereon for adjustably holding a wheel at the wheel hub.

5. A spare wheel support for installation on a vehicle frame chassis having longitudinal side frame members, comprising an inverted U-shaped bracket supported on said frame members, inclined seats secured to the lower portions of said bracket and extending substantially right-angularly therefrom, said seats being so formed as to support a spare wheel in substantially upright position and in a plane above said chassis side frame members, and adjustable wheel securing means on the upper portion of said bracket.

6. A carrier for supporting a spare wheel centrally over and between the ends of a vehicle chassis comprising vertically arranged upright members angle-shaped in cross section, said members being directly connected to the sides of said chassis and each thereof being provided with an inclined, longitudinally projecting flange adapted to support a wheel at spaced points below its horizontal diameter, a vertically slotted bracket connecting the upper end portions of said upright members, and means on said bracket adjustably arranged in said slot for securing a wheel at its hub to said bracket.

FREDERICK E. DAYES.